United States Patent [19]

Perdue et al.

[11] E Re. 30,009

[45] Reissued May 29, 1979

[54] VACUUM SKIN PACKAGE, AND PROCESS AND APPARATUS FOR MAKING SAME

[75] Inventors: Richard R. Perdue, Greer; Le Roy F. Hoagland; Richard O. Kuehne, both of Greenville, all of S.C.

[73] Assignee: W. R. Grace & Co., Duncan, S.C.

[21] Appl. No.: 872,297

[22] Filed: Jan. 25, 1978

Related U.S. Patent Documents

Reissue of:

[64] Patent No.: 3,694,991
Issued: Oct. 3, 1972
Appl. No.: 83,398
Filed: Oct. 23, 1970

[51] Int. Cl.[2] ..... B65B 31/02
[52] U.S. Cl. ..... 53/433
[58] Field of Search ..... 53/22 A, 112 A

[56] References Cited

U.S. PATENT DOCUMENTS

| | | | |
|---|---|---|---|
| 3,491,504 | 1/1970 | Young et al. | 53/22 A |
| 3,545,163 | 12/1970 | Mahaffy et al. | 53/22 A |

*Primary Examiner*—Travis S. McGehee
*Attorney, Agent, or Firm*—John J. Toney; William D. Lee, Jr.; John B. Hardaway

[57] ABSTRACT

In the prior art, vacuum skin packaging processes are performed by placing the product to be packaged on an impervious backing board; placing the product and board in a vacuum chamber; positioning a sheet of thermoplastic film above the product and backing board in the chamber; evacuating the chamber; then, either pulling the film down over the product or pushing the product up into the film; and, thereafter sealing the film to the board. In the present invention, a portion of the film is drawn by differential air pressure against the concave interior surface of the upper portion of a vacuum chamber; the film is then heated by surface contact; and then, after evacuation of the chamber, air pressure is used to blow the film down over the product and against the backing board. Thus, in the present invention, the film is shaped in a concave fashion surrounding the upper portion of the product and it is not necessary for the product to move. The height of the chamber may be adjusted for different products so that excess film is not used and wrinkling is prevented.

9 Claims, 6 Drawing Figures

VACUUM SKIN PACKAGE, AND PROCESS AND APPARATUS FOR MAKING SAME

Matter enclosed in heavy brackets [ ] appears in the original patent but forms no part of this reissue specification; matter printed in italics indicates the additions made by reissue.

FIELD OF THE INVENTION

This invention relates generally to skin packaging and specifically to vacuum skin packaging of both food and non-food items.

The term "vacuum" as used herein means a differential fluid pressure where the fluid can be either a gas or a liquid.

BACKGROUND OF THE INVENTION

Skin packaging is essentially a vacuum forming process. In a typical process, a sheet of thermoplastic film is placed in a frame, and below the frame is a vacuum plate upon which a piece of backing board is placed. The product to be skin packaged is positioned on top of the backing board and heat is applied to the thermoplastic film in the frame. When the film has been heated to become sufficiently soft, the frame is lowered and the plastic sheet drapes itself over the product. As this happens, a partial vacuum is created through the vacuum plate and the air underneath the plastic film is withdrawn through the backing board. The air pressure differential between the top and the bottom of the plastic sheet causes the sheet to be tightly pressed around the product. The film may be coated with an adhesive or the backing board may be so coated. Where the two contact each other, a strong bond is formed resulting in a package in which the product is tightly held to the backing board for safe shipping and for subsequent rack display in retail stores.

Vacuum skin packaging differs from the above described skin packaging process in that both the thermoplastic film and the backing board are impervious to gases and the resulting package can be evacuated and hermetically sealed, if desired. The same end result is sought, i.e. the product is to be tightly held by the transparent film to the backing board. The conventional method employs a backing board which is porous or which is perforated so that the vacuum may be drawn directly through the backing board. The vacuum skin packaging processes generally employs a vacuum chamber with an open top. The product on an impervious backing board is placed on a platform within the vacuum chamber. The top of the chamber is then covered by a sheet of film which is clamped tightly against the chamber to form a vacuum type closure. The chamber is evacuated while the film is heated to forming and softening temperatures. The platform can then be raised to drive the product into the softened film and air pressure can be used above the film to force it tightly around the product. This type of process is disclosed in French Pat. No. 1,258,357 issued to Alain G. Bresson on Mar. 6, 1961.

A refinement to the process described in the Bresson French Pat. is disclosed in French Pat. No. 1,286,018 issued on Jan. 22, 1962 to Laroch Freres, Limited. In the Laroch Freres process, after the chamber has been evacuated and the product driven into the heat softened film, the vacuum is released and ambient air is permitted to enter the chamber so that the thermoplastic film molds more or less on the product since there is a vacuum on the product side of the film and ambient air pressure on the other side of the film.

In Australian Pat. No. 245,774 issued to Colbro Proprietary Limited and Cole and Son Proprietary Limited on July 16, 1963, a vacuum skin packaging process is described in which an article to be packaged is inserted within the lower half of a vacuum chamber on a backing board, a thermoplastic film is placed over the open face of the lower half of the chamber, the chamber is closed and both halves are brought to essentially the same state of vacuum, the film heated and softened, and then atmospheric air is introduced into the upper half of the chamber so that it alone forces the thermoplastic film 6 down around the product and against the backing board.

Still another variation which can be found in the prior art, is that disclosed in U.S. Pat. No. 3,491,504 issued to W. E. Young et al. on Jan. 27, 1970. The Young patent discloses a process in which the softened film can be physically moved down over a stationary product and, in combination with air pressure, the softened thermoplastic film will be molded onto the product.

In all of the above described prior art processes, the thermoplastic film is stretched across the open face of a vacuum chamber. The product is then either driven up into the film, the film pulled down over the product, or air pressure is used to move the film. Having to physically move the film or the product slows down the packaging process and, in addition, requires that the product be strong enough to withstand the force of contacting the film. Furthermore, when the film is stretched flat and straight across the vacuum chamber, excess film is required and wrinkling of the film may occur due to unnecessary movement of the film. These disadvantages are overcome and many advantages are provided by the invention described hereinbelow.

SUMMARY OF THE INVENTION

In its broadest aspect the present invention is a vacuum skin packaging process comprising the steps of: shaping a cavity in a sheet of flexible packaging material, said cavity at least partially enclosing a product on an impervious backing board; generating a pressure differential across said sheet; and, moving said sheet against the product and into sealing engagement with the backing board by means of said pressure differential. The cavity which partially encloses the product allows a minimum of sheet packaging material to be used and at the same time provides a minimal distance for the film or sheet to be moved before contacting the product thus giving little opportunity for wrinkling of the sheet.

In a narrower aspect, the process of the present invention comprises placing the product to be packaged on a gas impervious supporting member; shaping a flexible sheet member into a concavity; maintaining the concave shape of the sheet; positioning said sheet over said product and supporting member so that said sheet partially coves but does not contact either the sheet or supporting member; evacuating the space between said sheet and said supporting member; moving said sheet from its concave shape and position so that it closely contacts said product and supporting member; and sealing the supporting member to the sheet member. In even more limited aspects, the present process includes the use of a flexible sheet member which is made from a formable thermoplastic film and includes heating the thermoplastic film to its forming temperature when it is in the concave shape. The film, of course could be preheated to its forming temperature before being shaped into a cavity and this requires that the film be maintained at its forming temperature until it is moved against the product and supporting member. A preferred method of shaping and moving the thermoplastic film is to use differential air pressure.

The apparatus which constitutes a part of the present invention will perform the above-described process. In particular, the apparatus comprises a vacuum chamber having an open top; means for supporting objects to be packaged within said chamber; means for evacuating the chamber; and closure means for the chamber which comprises a concave inner surface, a means for creating differential air pressure on the concave surface and means for heating the surface. A means for adjusting the height of the chamber for differing product heights is also included.

The process and apparatus of the present invention may be better understood by reference to the following detailed description and drawings.

DESCRIPTION OF THE DRAWINGS

In the drawings which form a part of this specification.

PREFERRED EMBODIMENTS

Figure 1:
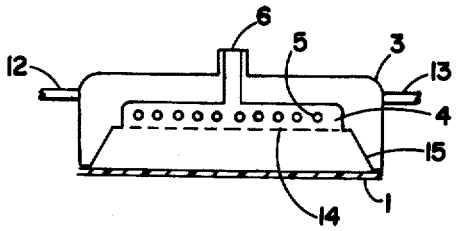
FIG. 1 is a schematic representation of a section through the closure means for the vacuum chamber of the subject invention showing a flexible packaging sheet member across the opening of the cavity in said closure means.
Figure 1A:
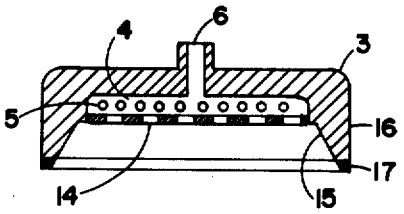
FIG. 1A is a sectional view of the closure means of FIG. 1 showing the arrangement of the heating elements, vacuum ports, and height adjusting means for the closure means.

Referring first to FIG. 1, a schematic sectional view of upper vacuum head 3 is shown. Vacuum head 3 serves as the closure means for the vacuum chamber described hereinbelow. The detail of the vacuum head 3 can best be appreciated by viewing both FIGS. 1 and 1A. In these figures it can be seen that inwardly sloping wall 15 and the horizontal wall portion containing ports 14 define a concave space or cavity within the vacuum head 3. Above the ports 14 is manifold space 4 having an exterior port 6. Heating elements 5 are placed within the manifold area for heating the wall containing the ports 14. These heating elements may either be steam lines with inlet 12 and outlet 13 feeding steam to elements 5; or, the elements may be electrically operated radiant heaters or resistance type heaters.

Vacuum head 3 has a vertical peripheral wall or leg 16 to which can be added a shim member 17 to extend or shorten the height of wall 16. The shim 17 conforms to the shape of the opening of the cavity in the vacuum head 3 and makes it possible to adjust the height of the head for different product sizes.

Figure 2:
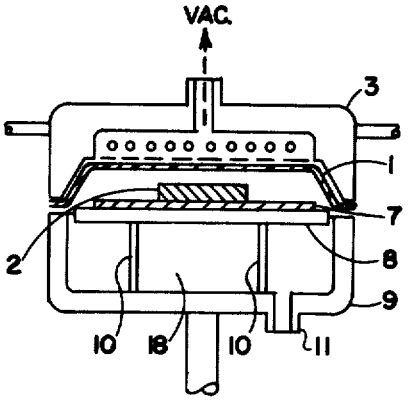
FIG. 2 is a schematic representation of the vacuum chamber and closure means with the sheet member formed into a concave shape and the product and supporting member in place within the chamber.

Turning now to FIG. 2, vacuum chamber 9 can be seen having platform 8 placed therein which is carried by platform supports 10. In position on the platform 8 is backing board or package supporting member 7 upon which has been placed the product 2 which is to be packaged. Flexible packaging film 1 is shown lining the cavity of the closure means 3. Chamber 9 has a manifold or cavity region 18 which has an exterior port 11 and which has a passageway to the head cavity which is defined by the space between chamber 9 and platform 8.

Returning now to FIG. 1 to describe the method of the present invention, a sheet of flexible packaging material 1 is shown stretched across the opening to the cavity in head 3. In most packaging applications, it is preferred that the sheet material 1 be transparent. Particularly suitable packaging materials are the thermoplastics such as polyethylene, cross-linked polyethylene, polypropylene, saran, nylon, polyvinylchloride, or the like and laminates of any of these materials. When thermoplastic materials are used, they will be relatively stiff or semi-rigid before being heated to a softened and formable stage. The present invention contemplates the use of such heat softenable thermoplastic materials and when such materials are placed across the opening to the cavity of head 3 as shown in FIG. 1, they may be either preheated to partially soften them, or they may be heated to softening temperatures by the radiant, conductive, and convective action of heaters 5.

After positioning the packaging material or film 1 as shown in FIG. 2, a pressure differential or vacuum is applied as shown in FIG. 2 by the arrow and the abbreviation "vac." This pressure differential, or vacuum, acts through ports 14, through manifold region 4, and through the exhaust ports 6. Any conventional vacuum pump can be used to apply this pressure differential. Upon the application of the pressure differential, the film 1 will assume the shape shown in FIG. 2. In this shape, the film 1 lines the cavity of the head 3 and is formed in the same concave shape as the cavity in the head. That is, a cavity is formed in the film 1 at this point.

Still referring to FIG. 2, it can be seen that product 2 has already been placed upon supporting member 7 which, in turn, has been placed upon platform 8. The supporting member 7 is preferably a gas impervious material and may be a metal such as aluminum sheet or foil; a plastic material such as polystyrene foam; a laminate of paper board with a gas impervious plastic coating; or, in general, any sheet-like clear or opaque material.

Figure 3:
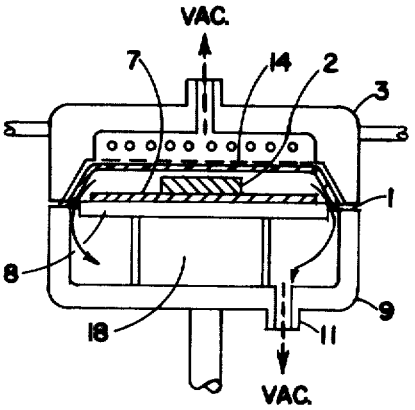
FIG. 3 is a schematic representation of the evacuation of the space between the sheet member and the supporting member.

As shown in FIG. 2, the film 1 shaped into a concave form or cavity has been positioned over the product 2 and supporting member 7. At this point the vacuum head 3 has not been closed upon the chamber 9. The closing of the chamber is accomplished as shown in FIG. 3. During this whole sequence of operation as shown in FIGS. 2 and 3, vacuum is constantly applied through ports 14, manifold 4, and port 6 to retain the concave shape of the film 1. In FIG. 3, with the chamber closed by closure member or head 3, vacuum or pressure differential is applied through port 11 and the application of this vacuum is illustrated by the downwardly pointing arrow and the abbreviation "vac. Arrows on either side of platform 8 are used to demonstrate the evacuation of the air and gas from the region or space between supporting member 7 and film 1. The path of the evacuated gases or air is from the vicinity or product 2, around the peripheral space between chamber 9 and platform 8 into the chamber cavity or manifold 18, and out through port 11. As stated before, during the evacuation of the chamber, the concave shape of the film 1 is retained preferably by application of vacuum through ports 14 and manifold 4. During this process further heating can be supplied to soften the film 1 when it is a thermoplastic material.

Figure 4:
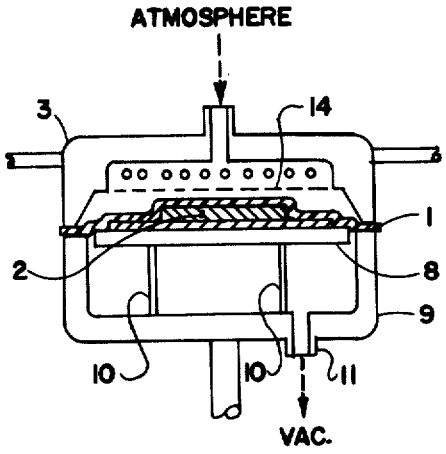
FIG. 4 is a schematic representation of the packaging sheet member after it has been moved against the product and into sealing engagement with the supporting member; and, FIG. 5 is a schematic representation of a vacuum skin package.

In FIG. 4, the film 1 is shown collapsed around and formed on product 2 and in contact with supporting member 7. The vacuum or pressure differential has been maintained through port 11 and the vacuum through port 6 has been released and atmospheric pressure has been admitted as shown by the downwardly pointing arrow from the word "atmosphere." Super-atmospheric pressure can be applied through port 6 to move the film more rapidly and securely against product 2; or sub-atmospheric pressure could be applied to slow down the movement and stretching rate of the film. To move the film 1 against the product 2 and supporting member 7, it is only necessary that the pressure on the lower side of the film be less than the pressure on the upper side. For instance, in the step illustrated in FIG. 3, the vacuum applied on the upper side of film 1 through ports 14 must necessarily be equal to or greater than the vacuum applied below the film through port 11 in order to retain the concave shape of the film; but, when the film 1 is moved against the product 2 as shown in FIG. 4, the action of the vacuum acting through port 11 serves to pull the film against the product 2. Or, viewed in another manner, the action of the atmosphere pushes the film 1 down on the product 2.

To hold and retain the cavity or concave shape of the film 1 as shown in the steps illustrated in FIGS. 2 and 3, it is usually necessary to draw a vacuum in excess of 20 inches of mercury through ports 14; and, to ensure complete package evacuation, a vacuum in excess of 20 inches of mercury is usually applied through vacuum port 11. For best results, a vacuum of about 29 inches of mercury through both ports is preferred. As long as the vacuum applied above the film is greater than, or no less than, the vacuum applied below the film, the film will remain in place. However, when the vacuum is released above the film, it will move downward. When the film moves downwardly, it has to move only through a short distance before it contacts the top of the product 2. This short distance is occasioned by the concave shape of the film and gives the film little opportunity to wrinkle before contacting the product 2 and forming on it.

Figure 5:
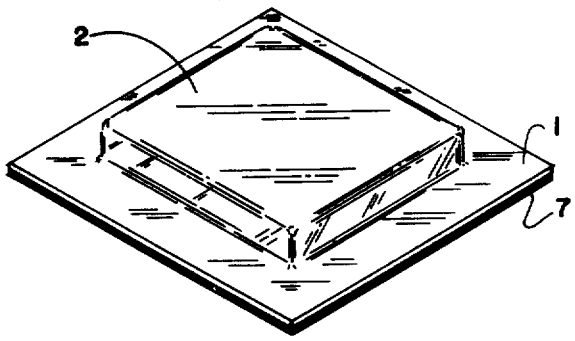

A further advantage of shaping the film 1 into a cavity prior to forming it around the product is that the film 1 can be clamped at approximately the same level as the supporting member 7. (See FIG. 3) When the product 2 and supporting member 7 are located well below the opening to the vacuum chamber 9, the edges of the film 1 will be stretched disproportionately and will not adhere to the edges of the supporting member 1 without difficulty and excess, unusable film around the periphery of the supporting membr 7 will result. Furthermore, in the present process, after being placed in the vacuum chamber the product and backing board remain stationary and do not have to be moved. This means that there is less likelihood of the product moving out of its position on the backing board 7 and less likelihood of the product 2 being distorted or even crushed by the physical movement of the product into the film. FIG. 5 shows a finished package made according to the present invention. Product 2, rectangular in shape, is covered by film 1 which closely conforms to the shape of the product. In other words, product 2 has served as the forming or die member for the film 1. The film 1 is sealed against the supporting member 7 which carries product 2. Preferably, the packaging film 1 will be of an impervious material, that is, one having relatively low air or oxygen transmission and the same will be true for the supporting member 7. The sealing between film 1 and supporting member 7 can be accomplished in several different manners. For example, the film 1 can be coated with an adhesive which can be heat activatable. Thus, when the film is heated by contact with the wall 15 of the cavity of head 3 under the influence of heaters 5 (see FIG. 2), the adhesive will be activated and subsequently, when the film is moved against the backing board 7 as shown in FIG. 4, the adhesive will seal to supporting member 7. When polyethylene is used as the film 1, a coating of ethylene vinyl acetate makes a very satisfactory heat activatable adhesive. Another means of sealing is to coat the supporting member 7 with a material such as polyethylene which will be the same material used in the film 1. Thus, when sufficiently heated, the like materials will bond or seal one to the other. Still another method of sealing is to put a pressure sensitive adhesive or heat activatable adhesive on the backing board and rely upon heat within the chamber to activate the adhesive.

The present invention is particularly suitable in packaging food products where an evacuated package is necessary to extend the shelf lifetime of the product. Various food items require packaging materials having differing moisture vapor transmission rates and oxygen permeability rates. Within the scope of this invention, packaging materials can be selected and used with properties that match the requirements for the packaged food item. Also, various atmospheres can be used for the product. For instance, the space containing the product can be flushed with an inert gas such as nitrogen and then a pressure differential applied to the film 1 through ports 14 to push it against the product 2 and backing member 7. Once sealed, a hermetically closed package is thus made.

Having thus described our invention, we claim:

1. A vacuum skin packaging process comprising:

a. placing the product to be packaged on a gas impervious supporting member;

b. shaping a *heat softenable,* flexible sheet member into a concavity *by differential air pressure;* c. maintaining the concave shape of said sheet *by said differential air pressure while heating said sheet to its softening and forming temperature;* d. positioning said sheet over said product and supporting member so that said sheet partially covers but does not contact either said product or supporting member;

e. evacuating gases from the space between said sheet and said supporting member, which contains said product *while maintaining said sheet in its concave shape at its softening and forming temperature until it is released to move against the product;* f. moving said sheet from its concave shape and position so that it closely contacts said product and supporting member; and, g. sealing said sheet against said supporting member.

2. A process for vacuum skin packaging a product on an impervious supporting member *by forming a heat formable thermoplastic member around said product* comprising the steps of:

a. drawing by differential air pressure [a] *said* formable plastic sheet member against a concave surface;

b. heating said concave surface to at least the softening temperature of said thermoplastic member;

c. maintaining said differential air pressure; while d. positioning said sheet member over said product on said supporting member;

e. evacuating the space between said supporting member and said sheet member *while retaining said sheet member against said heated concave surface to maintain said sheet member at its softening temperature until it is released to move against the product;* f. releasing the differential air pressure which maintained the concave shape of said sheet member, thereby causing said sheet member to collapse over and around said product and against said supporting member; and, g. sealing said thermoplastic sheet member to said supporting member as it collapses thereagainst.

3. A vacuum skin packaging process comprising:

a. providing a supporting platform within the lower portion of a vacuum chamber;

placing a product on an impervious backing member on said supporting platform;

c. shaping a heat softenable thermoplastic film in the cavity of the upper portion of said vacuum chamber;

d. retaining said thermoplastic film in said shape while e. heating said film to its softening and forming temperature;

f. positioning said upper portion of said chamber over said product and closing said chamber, said thermoplastic film being clamped between the upper and lower portions of said chamber;

g. evacuating said chamber *while maintaining said film at its softening and forming temperature until it is released to move against the product;* and, h. releasing said thermoplastic film from its retained position whereby it collapses around said product and is driven against said supporting member.

4. The process of claim 3 including the step of adjusting the height of the upper portion of said chamber in accordance with the height of the product to be packaged by adding a shim member to the lower periphery of said chamber.

5. The process of claim 3 wherein the thermoplastic material is polyethylene.

6. The process of claim 3 wherein the polyethylene is coated with a polymer of ethylene vinyl acetate.

7. The process of claim 3 wherein the impervious supporting member is made from thermoplastic foam.

8. The process of claim 7 wherein the thermoplastic foam is polystyrene foam and the heat softenable material is polyethylene coated with a polymer of ethylene vinyl acetate.

*9. A process for vacuum skin packaging a product positioned between two impervious sheet members one of which supports the product comprising the steps of:*

*a. drawing by differential air pressure one of said impervious sheet members which is a heat-softenable, formable plastic material against a concave surface which is shaped to partially enclose the product to be packaged;*

*b. maintaining said differential air pressure while;*

*c. heating said concave surface to at least the forming and softening temperature of said heat softenable and formable plastic sheet member;*

*d. positioning one sheet member over said product on said supporting member with the product therebetween and said formable sheet member on said concave surface partially enclosing said product; and*

*e. evacuating the space between said supporting member and said sheet member while retaining by said differential air pressure the formable sheet member in contact with said heated concave surface to maintain said formable sheet member at its forming and softening temperature;*

*f. then increasing the air pressure on the exterior of the formable sheet member to cause it to be released from contact with the concave surface thereby causing the formable sheet member to collapse around and into conforming contact with the product and against said other sheet member; and*

*g. sealing the heat formable and softenable sheet member to the other sheet member as the heat formable and softenable sheet member collapses thereagainst.*

* * * * *